United States Patent

Haraway

Patent Number: 5,454,619
Date of Patent: Oct. 3, 1995

[54] AERODYNAMICALLY RESPONSIVE VEHICULAR SAFETY SPOILER SYSTEM

[76] Inventor: William M. Haraway, Jr., 319 Rudisill Rd., Hampton, Va. 23669

[21] Appl. No.: 257,725

[22] Filed: Jun. 9, 1994

[51] Int. Cl.⁶ .................................................. B62D 35/00
[52] U.S. Cl. .................................. 296/180.1; 296/180.5; 180/903; 188/270
[58] Field of Search ................ 296/180.1–180.5; 188/270; 180/903; 105/1.1–1.3

[56] References Cited

U.S. PATENT DOCUMENTS

| | | |
|---|---|---|
| 3,791,468 | 2/1974 | Bryan . |
| 3,894,764 | 7/1975 | Powell ........................... 296/180.5 |
| 4,119,339 | 10/1978 | Heimburger ................. 180/903 X |
| 4,131,308 | 12/1978 | Holka et al. ................... 296/180.5 |
| 4,629,240 | 12/1986 | Dornier ........................ 296/180.5 |
| 4,635,991 | 1/1987 | Parno . |
| 4,674,788 | 6/1987 | Ohmura et al. ............... 296/180.5 |
| 4,854,635 | 8/1989 | Durm . |
| 5,165,751 | 11/1992 | Matsumoto . |
| 5,236,242 | 8/1993 | Seeman ..................... 296/180.5 X |
| 5,374,098 | 12/1994 | Nelson ........................ 180/903 X |

FOREIGN PATENT DOCUMENTS

| | | | |
|---|---|---|---|
| 2726507 | 12/1978 | Germany ........................ 296/180.1 |
| 61-67676 | 4/1986 | Japan ............................. 296/180.1 |
| 63-103776 | 5/1988 | Japan ............................. 296/180.5 |

*Primary Examiner*—Dean Kramer
*Attorney, Agent, or Firm*—Wallace J. Nelson

[57] ABSTRACT

A spoiler system for race car vehicles wherein a spoiler plate(s) is pivotally movable between a position spoiling the aerodynamic air flowing over the vehicle when traveling in a forward direction, to a position spoiling the aerodynamic air flowing over the vehicle roof when traveling in a high speed rearward direction, as occurring in a vehicle spin. The spoiler plate (unitary or segmented) is provided on the aft end of the vehicle with adjustable pylon stop members, having angular faces serving to limit the angular, rearward, pivotal movement thereof. Additional winglet pylons are provided on the vehicle deck and have angular faces that contact and limit the forward pivoting of the spoiler plate(s) when the vehicle undergoes a spinning maneuver and travels in a high speed rearward direction.

18 Claims, 9 Drawing Sheets

AERODYNAMICALLY RESPONSIVE VEHICULAR SAFETY SPOILER SYSTEM

FIELD OF THE INVENTION

This invention relates to spoiler systems in general, and relates specifically to an aerodynamically responsive spoiler system for race cars and similar vehicles.

BACKGROUND OF THE INVENTION

Various types of fixed rear spoilers have been employed for automobiles, including race cars, that serve to spoil or divert air flow passing over the aerodynamic surfaces of the vehicle to thereby reduce, or negate, the aerodynamic lift created thereon by high speed air flow. These spoilers are normally set at a minimum angle by the sanctioning body controlling race car competition. At this angle, the spoilers located on the deck lid of the vehicles provide positive aerodynamic down forces on the rear end of the vehicle to thereby increase tire traction, enhance directional stability and, as one of several devices employed, to limit maximum vehicle speed. Speeds approach approximately one-hundred ninety miles per hour (190 mph) during competition and Often, when one race car contacts another aft of the center of gravity these high speeds, radial inertia forces causes it to rotate, or spin, through a one-hundred eighty degree arc angle and become airborne while going in the backward direction. The fixed spoiler, and aerodynamic design of the race car vehicle, exposed to the high velocity aerodynamic air stream lifts the rear end of the car off the ground, resulting in tumbling, cartwheeling and airborne rolls before striking the ground. Extensive car damage and/or driver injury is the result. The hard mounted, or fixed spoiler, at a high angle of attack contributes greatly to the aerodynamic lift effect when travelling in a high speed, backward mode.

Accordingly, it is an object of the present invention to provide an improved spoiler system for race cars that will provide a spoiling effect to the air passing over the aerodynamic surfaces of the car when travelling at a high speed in both the forward and rearward directions.

It is another object of the present invention to provide a spoiler for a race car vehicle that is responsive to the direction of movement of the vehicle.

Another object of the present invention is to provide an angular adjustable spoiler system for a race car vehicle.

An additional object of the present invention is to provide a segmented spoiler system for race car vehicles.

A further object of the present invention is to provide a spoiler system for a race car vehicle that is movable between a position spoiling the aerodynamic air flowing over the vehicle when traveling in a forward direction, to a position spoiling the aerodynamic air flowing over the vehicle roof when traveling in a high speed rearward direction.

Another object of the present invention is to provide a spoiler system for race car vehicles that produces a positive aerodynamic down force to the vehicle when traveling in a high speed rearward direction.

A still further object of the present invention is to provide a spoiler system wherein the spoiler plate is aerodynamically returned to its normal rearward facing direction as the race car vehicle resumes its normal forward direction after recovering from a spin.

SUMMARY OF THE INVENTION

According to the present invention, the foregoing and additional objects are attained by providing a spoiler plate transversely, and pivotally, connected to an aerodynamic surface of a race car vehicle. The spoiler plate is in the form of a unitary plate in one aspect of the present invention. In other aspects of the invention, the spoiler plate is formed of two spaced plates and in another aspect of the invention, multiple plate sections are employed to form the vehicular spoiler. In each instance, pylons are provided, fixed to the vehicle, to limit the pivotal movement of the spoiler plate in both the fore and aft directions. The pylons are individually adjustable, either manually, or by servo motors, to determine the limits of the spoiler plate angular movement in both the fore and aft directions.

The pylons take the form of fixed winglets, in one aspect of the invention, with angular surfaces on the pylons serving to contact and limit the fore and aft pivoting movement of the spoiler plate(s). In another aspect of the invention, the pylons are provided with arcuate slots, or openings, therein to receive a guide pin extending from each end of the spoiler plate(s) with the fore and aft movement of the spoiler plate being confined to the limits of the arcuate slots.

BRIEF DESCRIPTION OF THE DRAWINGS

A more complete appreciation of the invention and many of the attendant advantages thereof will be readily apparent as the same becomes better understood in reference to the accompanying drawings wherein.

DETAILED DESCRIPTION

Figure 1:
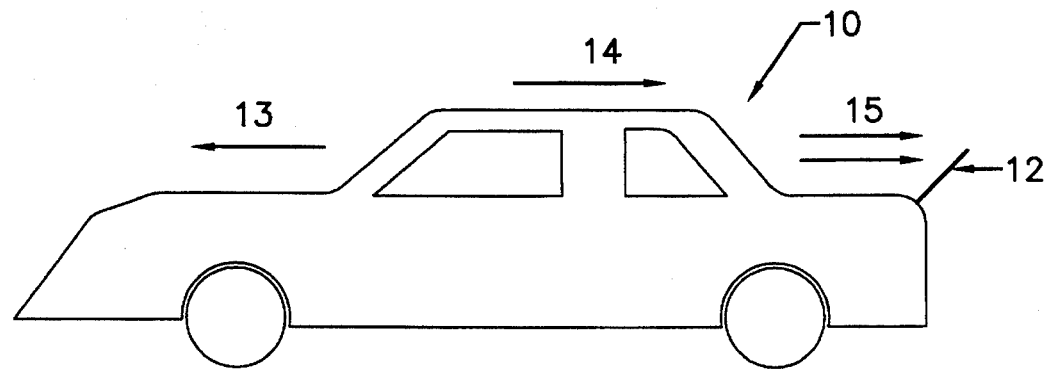
FIG. 1 is a part schematic, side-view, representation of a race car employing a spoiler system according to the present invention.

Referring now to the drawings, FIG. 1 shows an exemplary race car vehicle, designated generally by reference numeral 10, and employing a spoiler system 12 according to the present invention. The single forward pointing arrow 13 designates the direction of travel of vehicle 10, while the single rearward pointing arrow 14 and the group of rearward pointing arrows 15 indicate, respectively, the aerodynamic air flow over the top of race car 10 and the aerodynamic air flow striking and being spoiled by spoiler system 12 on the rear deck of vehicle 10.

Figure 2:
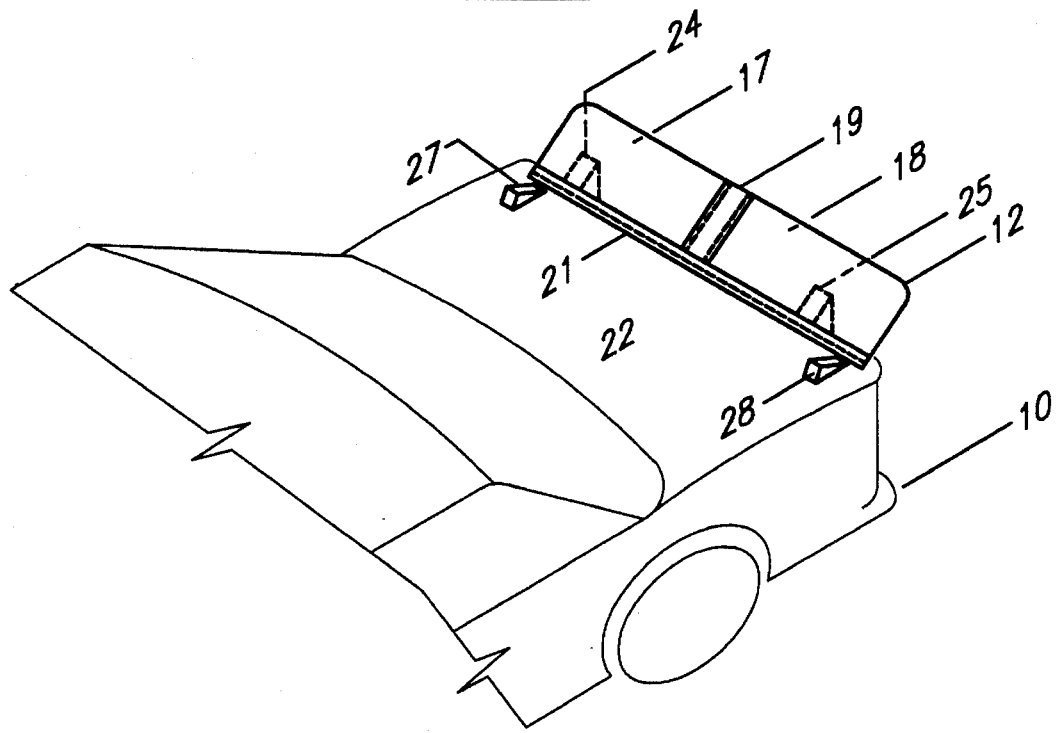
FIG. 2 is a part schematic, top perspective of the spoiler system shown in FIG. 1.

Referring to FIG. 2, a top view of an illustrative spoiler system 12 is shown and includes a split or segmented spoiler plate divided into two parts, as designated by reference numerals 17 and 18. A vertical strip of suitable sealing and removable tape 19 is employed to close the spaced area between the spoiler plate segments 17 and 18. An additional strip of sealing tape 21 is disposed on the aft area of deck 22 of vehicle 10 and extends transversely therealong to sea the hinge connection of spoiler system 12 and prevent any air passage between deck 22 and the spoiler system when vehicle 10 is traveling in the forward direction. A pair of rear pylons 24, 25 (shown in dotted lines) are vertically disposed on the rear portion of vehicle 10 aft of, or on the vertically depending end, of rear deck lid 22. Pylons 24 and 25 are provided with rearwardly sloping surfaces to serve as limit stops for spoiler segments 17 arid 18. Pylons 24 and 25 are provided with angularly adjustment structure to permit selection of the angular slope for the sloping surfaces thereon, as will be further explained hereinafter. A pair of forward pylons 27,28 are secured to the top of deck lid 22 and are each also provided with a sloping surface to contact and limit angular movement of respective spoiler segments 17, 18 when deflected in the forward direction relative to vehicle 10, as will also be further explained hereinafter.

Figure 3A:
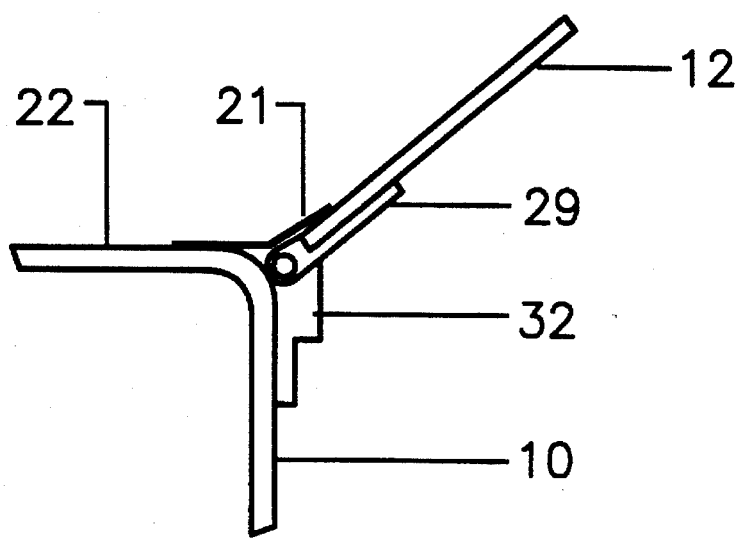
FIG. 3A is a partial side view illustrating one form of the hinge mechanism for the spoiler system shown in FIGS. 1 and 2.

Referring to FIG. 3A, a side view of the air dam created by the strip of sealing tape 21 is shown. Also, illustrated in this FIG. is a tension spring 29 for hinge 32 employed in this embodiment of the invention. A separate tension spring 29 extends along the length of each spoiler plate segment 17,18. Tension spring 29 serves to retain the plate segments in the aft deflected position shown during forward movement of vehicle 10, but permits the plate segments to pivot about hinge 32 when vehicle 10 is traveling at a high speed rearward direction, as occurs in a vehicle spin. The pylon stops for the spoiler segments are omitted in this FIG. in the interest of clarity.

Figure 3B:
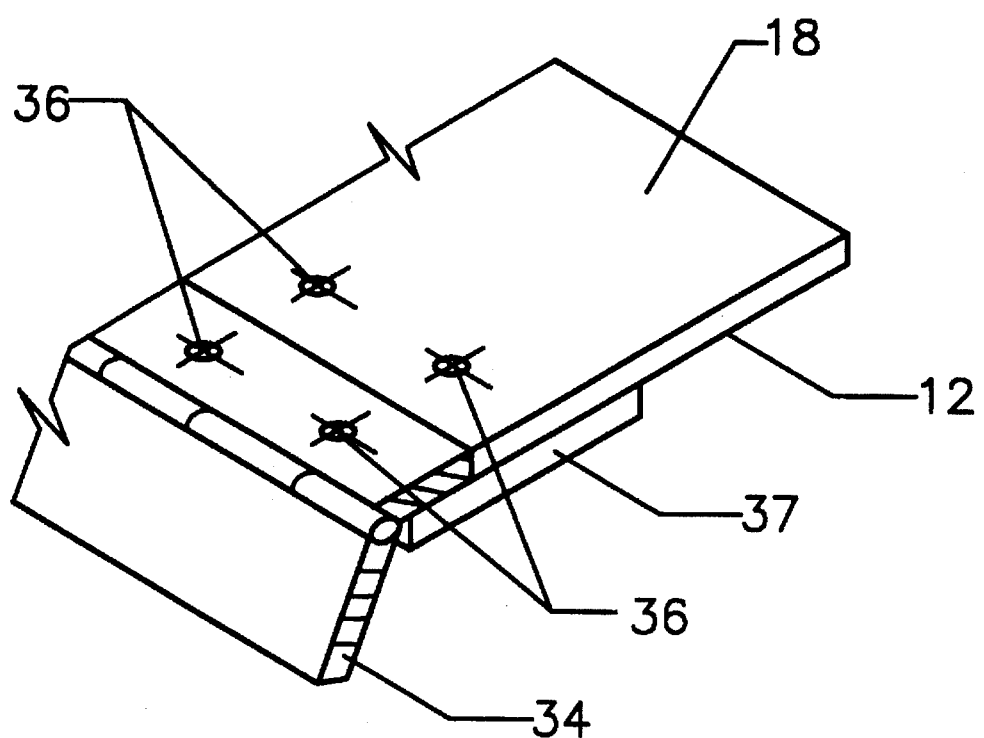
FIG. 3B is a part side perspective of another form of the hinge connection for the spoiler system shown in FIGS. 1 and 2.

Referring now to FIG. 3B, a conventional piano-type hinge 34 employed to support spoiler segment 18 of spoiler system 12, is illustrated. Suitable bolts (or rivets) 36 are employed to attach hinge 34 to spoiler segment 18 and extend therethrough to connect with a doubler plate support 37. Identical structure is employed to connect spoiler plate segment 17 but is omitted in this FIG. in the interest of brevity.

Figure 4A:
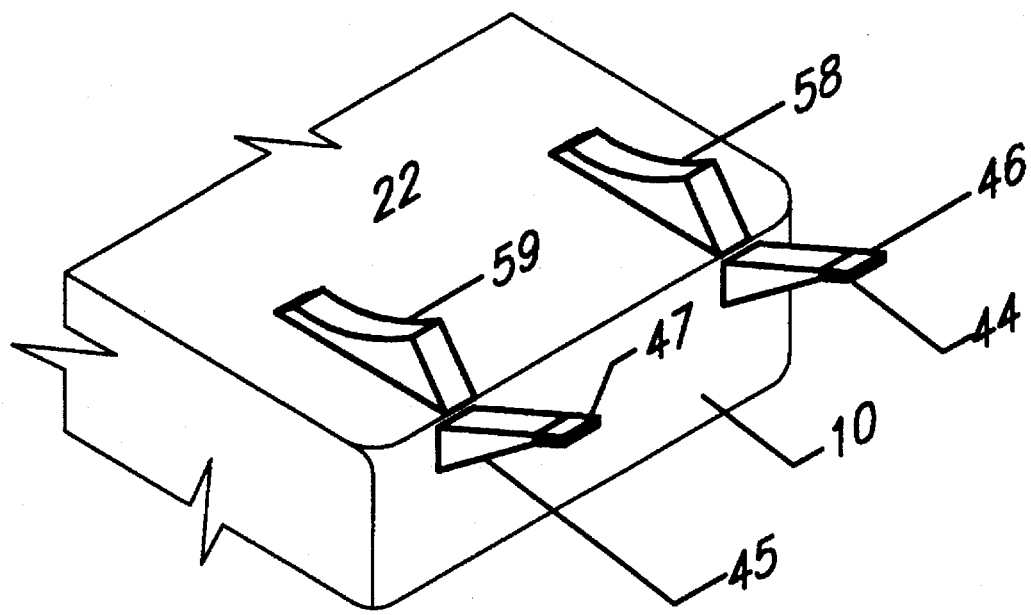
FIG. 4A is a part perspective, top view of the pylons for limiting fore and aft pivotal movement of the spoiler system according to one aspect of the present invention.
Figure 4B:
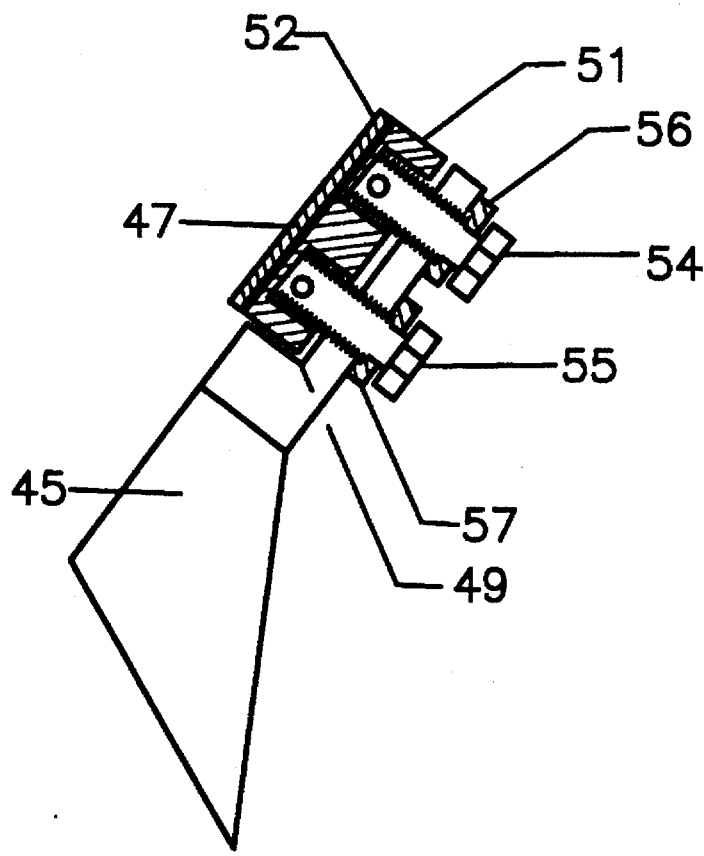
FIG. 4B is a part schematic, part sectional, side view of one mechanism for adjusting and maintaining the proper angle setting for the spoiler of the present invention.

Referring to FIGS. 4A and 4B, the pylons employed in one specific embodiment of the invention are shown. The spoiler segments are omitted in these FIGS for purposes of clarity. As shown therein, a pair of aft pylons 44,45 are vertically disposed on the rear portion of vehicle 10 aft of the top, or on the vertically depending end, of rear deck lid 22. Each of pylons 44,45 is provided with a rearwardly sloping surface to engage the spoiler plate segments. An end portion of this sloping surface, in each pylon, is in the form of an adjustable magnetic latch, as designated by respective reference numerals 46,47.

The details of magnetic latch 47 are shown in, and will be described in reference to, FIG. 4B. It is to be understood that the details of magnetic latch 46 is identical and are omitted herein in the interest of brevity. As shown therein, a cutaway portion 49 is provided in the face of pylon 45 and serves to receive a support block 51. A magnet plate 52 is adhesively, or otherwise conventionally secured to, support block 51. A pair of adjustment screws 54,55 threadingly extend through the rear surface of pylon 45 and are provided with ends thereon that are rotatably secured within support block 51. Adjustment screws 54,55 are provided with individual lock nuts, as designated, respectively, by reference numerals 56,57.

In operation, magnetic plate is initially flush with the rest of the surface of pylon 45 facing the spoiler plate segment. The race car sanctioning body (usually NASCAR) initially sets the magnetic latch 47 (and 46) at the minimum angle that they have determined suitable for that particular race or race track. This angle, at present, is generally thirty-five degrees, or greater, with respect to the horizontal, and can be varied. When adjustment screws 54,55 are employed for the sanctioning body use, respective lock nuts 56,57 thereon will be tightened and a seal placed on the adjustment screws that will be inspected after the race to ensure that it has not been tampered with. An identically designed and mounted magnetic latch plate (not shown) is disposed adjacent to, but not connected to the sanctioning body latch plate, and may be used by the driver or pit crew before or during the race to increase the angle of the spoiler plate deflection in the rearward direction only.

A pair of forward pylons 58,59 (FIG. 4A) are secured to the top of deck lid 22 and are each also provided with a sloping surface to contact and limit angular movement of respective spoiler segments 17,18 when deflected in the forward direction relative to vehicle 10, as described hereinbefore. The forward sloping surface on pylons 58,59 is normally within the range of thirty-five to fifty-five degrees. When it is desired to change the forward slope of pylons 58,59 they are removed and replaced with other pylons having the desired slope angle.

Figure 5:
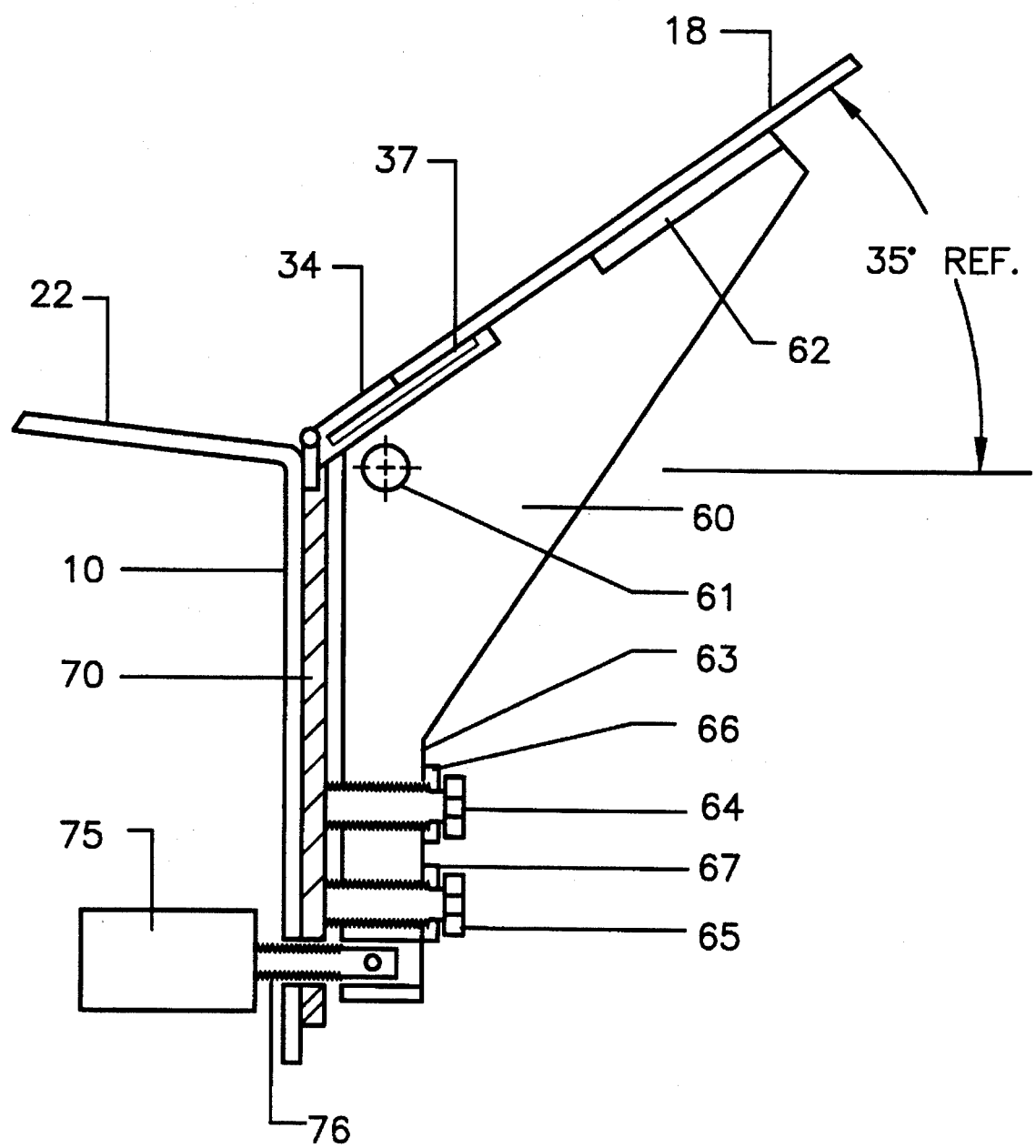
FIG. 5 a part schematic, part sectional, side view of another mechanism for adjusting and maintaining the proper angle setting for the spoiler of the present invention.

Referring now more particularly to FIG. 5, an alternate attachment and adjustment system are illustrated for the rear pylons on vehicle 10. As shown therein, an exemplary rear pylon 60 is pivotally connected to vehicle 10 at the aft end thereof by pivot pin 61. This pivotal connection is in lieu of the fixed connection employed for the rear pylons 24,25 and 44,45 described hereinabove in reference to FIGS. 2 and 4.

The spoiler plate segment 18, hinge 34 therefor, and the doubler plate support 37, illustrated in FIG. 5 are as described hereinbefore in reference to FIG. 3B. In addition, a magnetic strip of metal 62 is adhesively, or otherwise conventionally, secured to the lower surface of spoiler segment 18. Magnetic strip 62 is attracted to and completes magnetic latch 47, described hereinabove in reference to FIGS. 4A and 4B, to releasably retain spoiler plate segment 18 in the aft directed position shown. Magnetic strip 62 is needed when spoiler plate segment 18 is formed of a non-magnetic material such as plastics, composites, aluminum, aluminum alloys, and the like. When the bottom or vertical leg portion 63 of pylon 60 is disposed parallel to and adjacent the aft end of vehicle 10, as shown in FIG. 5, the angular relationship of the slope surface on the pivotal portion thereof is at approximately thirty-five degrees, or greater, with respect to the horizontal.

A pair of adjustment screws 64,65 threadingly extend through vertical leg portion 63 of pylon 60 to permit pivotal movement of pylon 60 about pivot point 61 for adjustment of the angle of the sloping surface thereon. A pair of lock nuts 66,67 engage respective adjustment screws 64,65 for locking adjustment screws 64,65 in position. In practice, adjustment screws 64,65 rotatably bear against a fixed plate 70 vertically secured to the aft end of vehicle 10, As either screw 64 or 65 is rotated within the threaded passage provided therefor in the bottom portion 63 of pylon 60, this portion of pylon 60 pivots about pivot pin 61 and effects upward or downward relative movement of the integral sloping surface thereon. The sanctioning body (NASCAR) selects the desired angular relationship for the sloping surface determined by the race or race track and sets the pylons accordingly by, for, example adjustment screw 65. After this setting the lock nut 67 is tightened and sealed. The driver or pit crew may then employ adjustment screw 64 to increase this angle before or during the race but cannot decrease the angle without breaking the seal and being disqualified from sharing in the winning purse.

An additional angle adjustment for pylon 60 is provided within the car to permit the driver to change (increase) the angle of pylon 60 during a race and without requiring a pit stop, if so desired. This adjustment is provided via an electric servo motor 75 carried in the trunk of vehicle 10. Servo motor 75 is operable by the driver through controls provided on the instrument panel (not shown). Servo motor 75 actuates rotation of a screw 76 that threadingly extends through the trunk and panel 70 to be rotatably received within the vertical bottom portion 63 of pylon 60. When screw 76 is rotated it effects movement of pylon portion 63 about pivot pin 61 to effect the angle of the sloping surface segment thereof. Servo motor 75 and screw 76 can only be used to increase the angle of the sloping surface and cannot decrease this angle as set by the sanctioning body without breaking their seal and resulting in disqualification of the car in that race. When it is contemplated that the servo adjustment will be employed, manual adjustment screw 64 is, either set at the minimum angle or, completely withdrawn prior to the race. Also, if it is contemplated that only the manual adjustment will be employed, the servo motor 75 will be disconnected from its adjustment screw 76 prior to the race.

Figure 6:
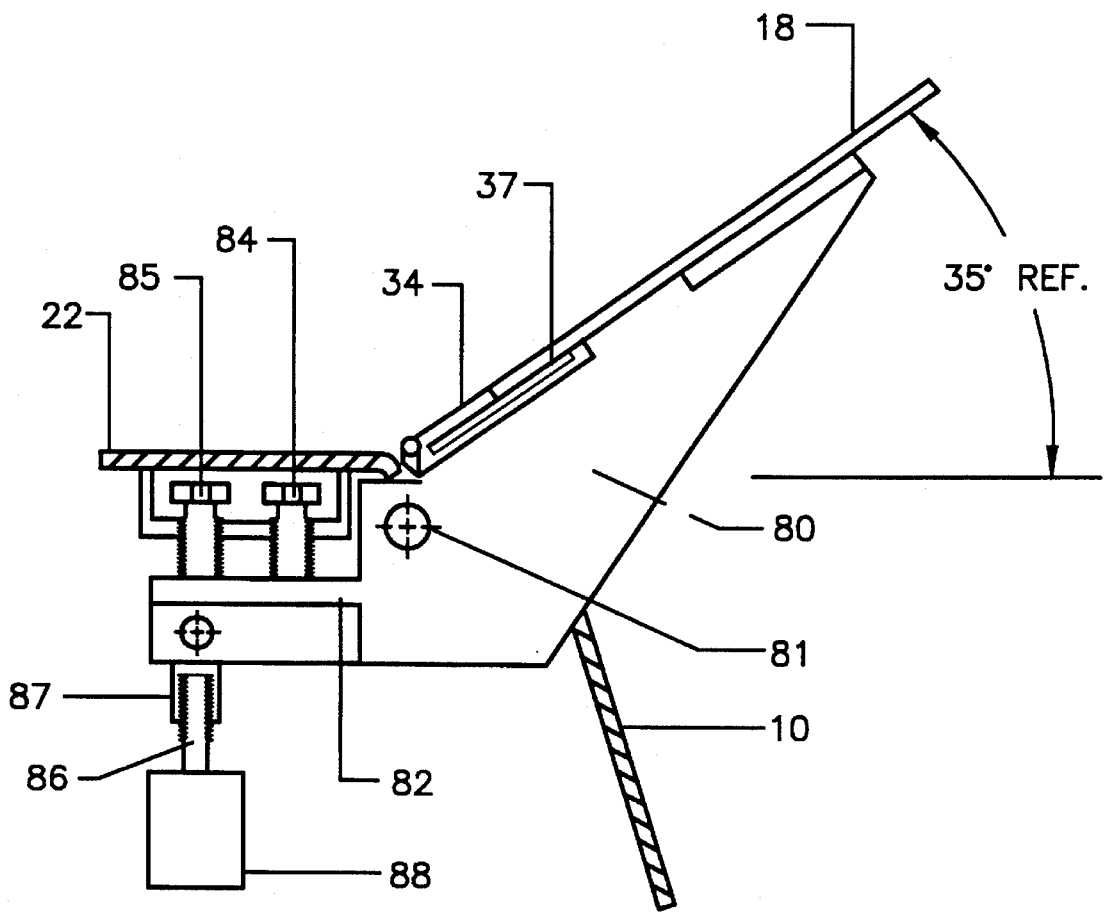
FIG. 6 is a part schematic, part sectional, view of another mechanism for adjusting and maintaining the proper angle setting for the spoiler of the present invention.

Referring now to FIG. 6, an adjustment and support mechanism disposed beneath the vehicle deck lid 22 for the angularly adjustable rear pylons, is illustrated. In this embodiment, the sloping surface of a pylon 80 is pivotally movable about a pivot pin 81 disposed beneath the deck lid 22 and within the trunk of vehicle 10. A horizontal leg 82 of pylon 80 extends within the vehicle trunk and is provided with adjustment screws 84,85 therein. Adjustment screws 84,85 threadingly extend through structure in the vehicle trunk and are rotatably secured to horizontal leg 82 such that rotation of screws 84,85 effect pivotal movement of pylon 80 about pivot pin 81 to increase/decrease the angular relationship of the sloping surface thereon with respect to the horizontal.

In this embodiment, adjustment screw 84 is turned by the sanctioning body personnel to initially set the minimum angle for spoiler segment 18 and the others, not shown, to the predetermined angle for that race and that track. As in the previously described embodiment, a suitable lock nut is provided for adjustment screw 84 (and 85) and is not shown in this FIG. in the interest of clarity. A suitable seal is then applied by the sanctioning body member to ensure that the angular setting of the pylon(s) is not reduced. Adjustment screw 85 may then be employed by the driver or pit crew to increase the angular relationship of the pylon(s) 80 but this angular setting cannot be decreased without breaking the seal and thereby disqualifying the car from sharing in the race purse.

An electric servo motor 88 and adjustment screw 86 driven thereby, are also disposed beneath deck lid 22 and operable by the vehicle driver, through suitable instrumentation on the vehicle dashboard, to permit increasing the angular adjustment of pylon 80, and thus the slope of spoiler segment(s) 18 during the race, if so desired. Adjustment screw 86 is threadingly received by fixed structure 87 in the vehicle trunk and rotatably attached to horizontal arm 82 of pylon 80 to permit movement thereof upon rotation of the screw. In operation, when it is contemplated that the servo adjustment will be employed, manual adjustment screw 85 is, either set at the minimum angle, or completely withdrawn from its mounting, prior to the race. Also, if it is contemplated that the manual adjustment will be employed, the servo motor 88 will be disconnected from its adjustment screw 86 prior to the race.

Figure 7:
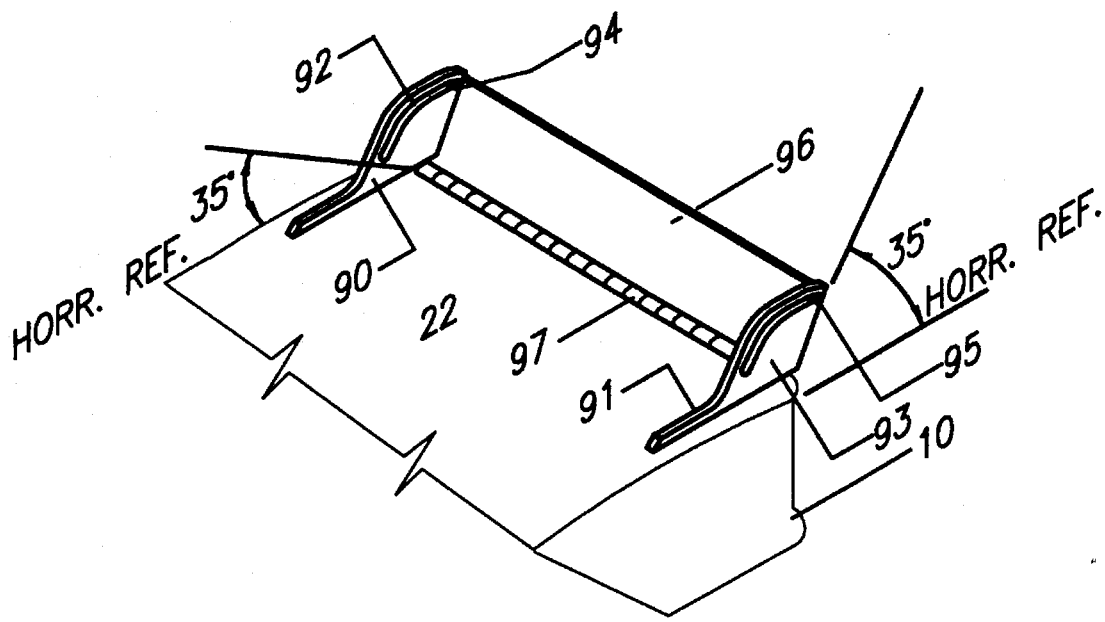
FIG. 7 is a part schematic, top perspective, view of a modified support structure for the spoiler of the present invention when the vehicle is traveling in a high speed forward direction.
Figure 8:
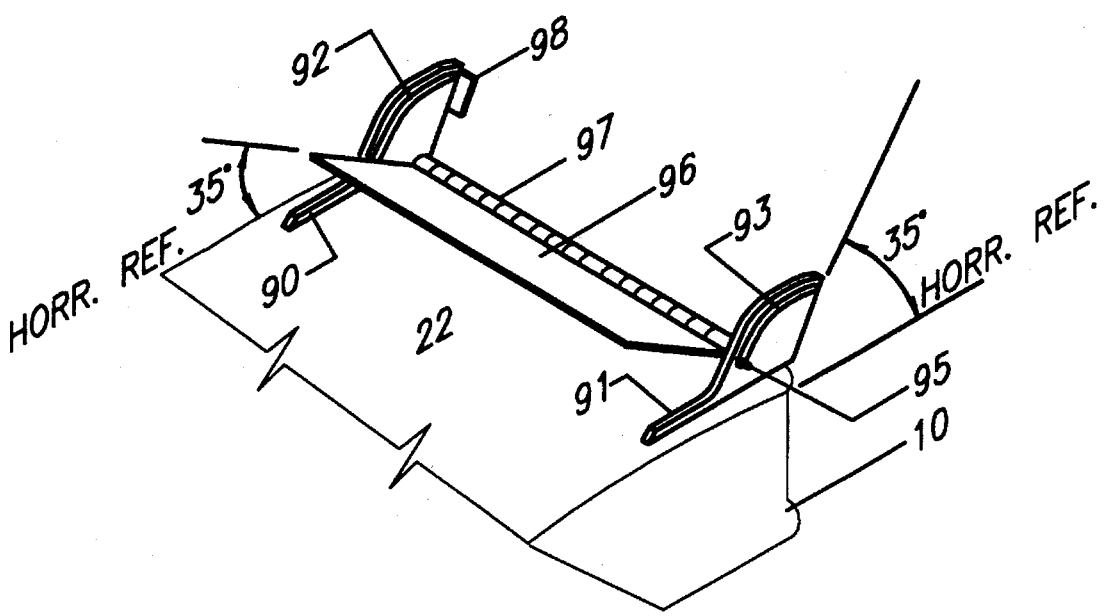
FIG. 8 is a view similar to FIG. 7 and illustrating the spoiler pivoted position when the vehicle is traveling in a high,speed rearward direction.

Referring now more particularly to FIGS. 7 and 8, a modified pylon and spoiler support structure is shown. In this embodiment a pair of pylons, or winglets, 90, 91 are disposed on the outboard portion of deck lid 22 of vehicle 10. Winglets 90,91 are provided with curved top surfaces and each have an arcuate slot or groove formed therethrough, as designated by respective reference numerals 92,93. Grooves 92,93 serve to receive respective guide pins 94,95. Guide pins 94,95 extend from opposite ends of a single, unitary, spoiler plate 96 that is hingedly connected, via hinge 97, to the aft end of deck lid 22.

During forward high speed travel of race car vehicle 10, spoiler plate 96 is maintained in the rearward sloping angular position illustrated in FIG. 7, with rearward pivoting thereof being limited by arcuate grooves 92,93 confining the rearward rotative movement of guide pins 94,95. In addition, an optional backup retention plate 98 (FIG. 8), and an identical retention plate (not shown) may be fixedly attached to the aft end of respective winglets 90,91 to contact and serve as additional stops for spoiler plate 96 when in the position shown in FIG. 7. Hinge 97 may be a conventional piano-type hinge, or the tension type hinge illustrated and described hereinbefore in reference to FIG. 3A. The positioning of arcuate slots or grooves 92,93, along with retention plates 98,(and the one not shown in these FIGS), control and permit setting of the angular relationship of spoiler plate 96 at thirty-five degrees (or other desired angle), with respect to the horizontal.

Forward movement, or pivoting, of spoiler plate 96 is also controlled by the limited movement of guide pins 94,95 within their respective slots or grooves 92,93. The forward angle of spoiler plate 96 is also normally set at thirty-five to fifty-five degrees, with respect to the horizontal, but may be less, or greater, as so desired. Suitable plugs may be installed in slots 92,93 to restrict the forward pivoting of spoiler plate 96, and thereby increase the angular relationship thereof, with respect to the horizontal, if so desired.

Figure 9:
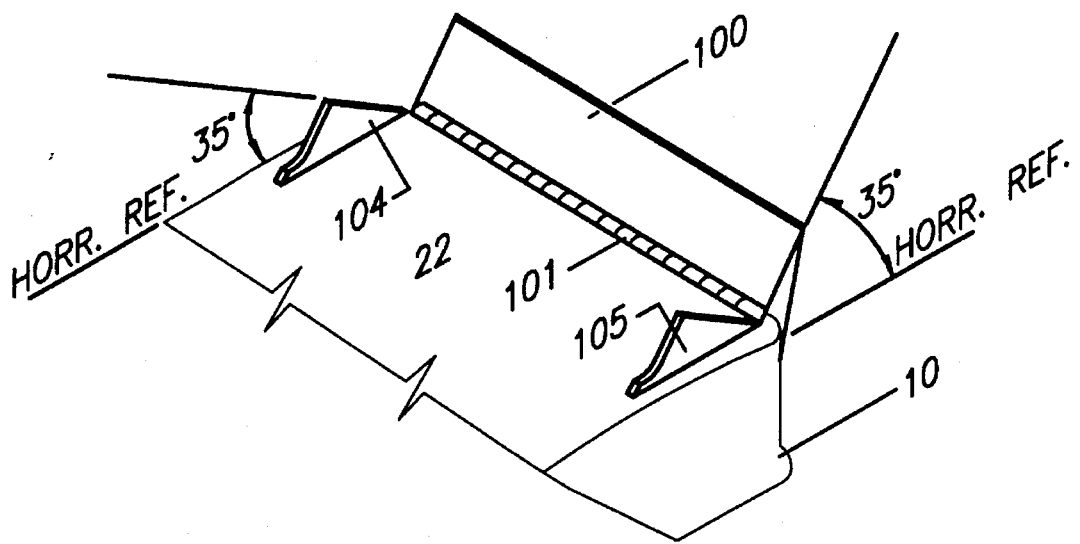
FIG. 9 is a part schematic, top perspective, view of another support structure for the spoiler of the present invention when the vehicle is traveling in a high speed forward direction.
Figure 10:
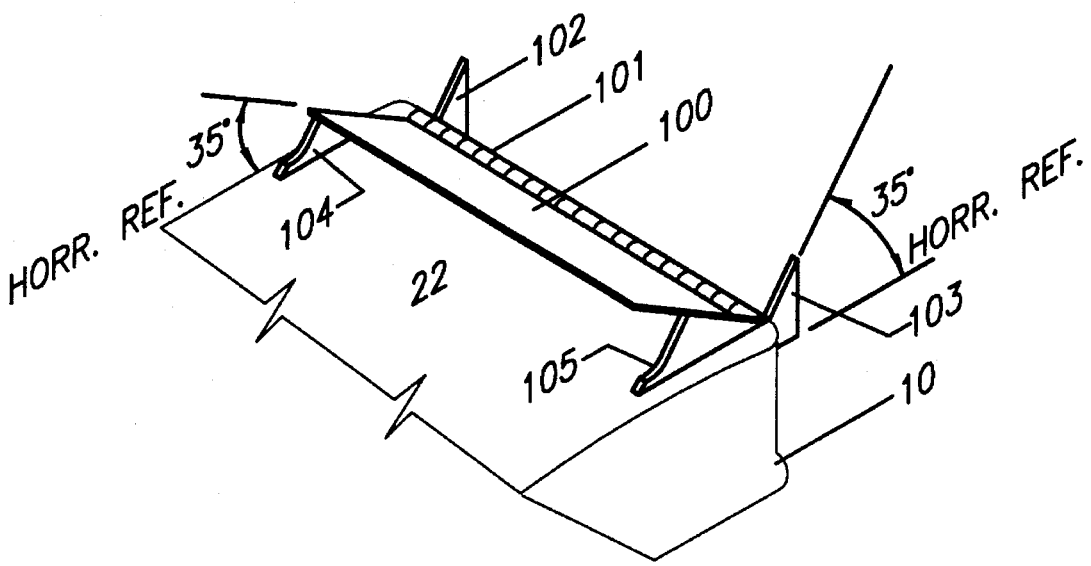
FIG. 10 is a view similar to FIG. 9 and illustrating the forward pivoted position for the spoiler when the vehicle is traveling in a high speed rearward direction.

Referring now to FIGS. 9 and 10, another form of the spoiler system of the present invention is illustrated, as appearing in the high speed vehicle forward motion position (FIG. 9), and as appearing in the high speed rearward vehicle direction, as occurs when the vehicle 10 is involved in a spin (FIG. 10). As shown therein, spoiler plate 100 is shown deflected in the rearward direction with a slope of thirty-five degrees with respect to the horizontal, in FIG. 9.

Rearward pivotal rotative movement of spoiler plate 100, about hinge 101 therefor, is limited by contact with the sloping faces on outboard pylons 102,103, FIG. 10. The rearward deflected position of spoiler plate (FIG. 9) is maintained while vehicle 10 is traveling at a high rate of speed in the forward direction. In the event of a spin, where vehicle 10 rotates one-hundred eighty degrees and commences high speed rearward travel, spoiler plate 100 pivots about hinge 101 to rotate forward to the position shown in FIG. 10, where further forward pivoting thereof is limited by the sloping faces on winglet pylons 104, 105 disposed on the outboard surfaces of deck 22. As illustrated, the slope angle for both rear pylons 102, 103 is normally thirty five degrees, or greater, and forward winglet pylons 104, 105 are normally set at thirty-five to fifty-five degrees with respect to the horizontal but may be less, or greater, as so desired. This pylon (and spoiler) angular positioning is for illustrative purposes only and may be changed, as so desired. Also, rear pylons 102, 103 and forward winglet pylons 104, 105 may be adjusted to vary the angle of the sloping surfaces thereon prior to installation, or by any of the pylon adjustment mechanisms described hereinbefore to change the angles for the sloping stop faces thereon, as permitted.

Figure 11:
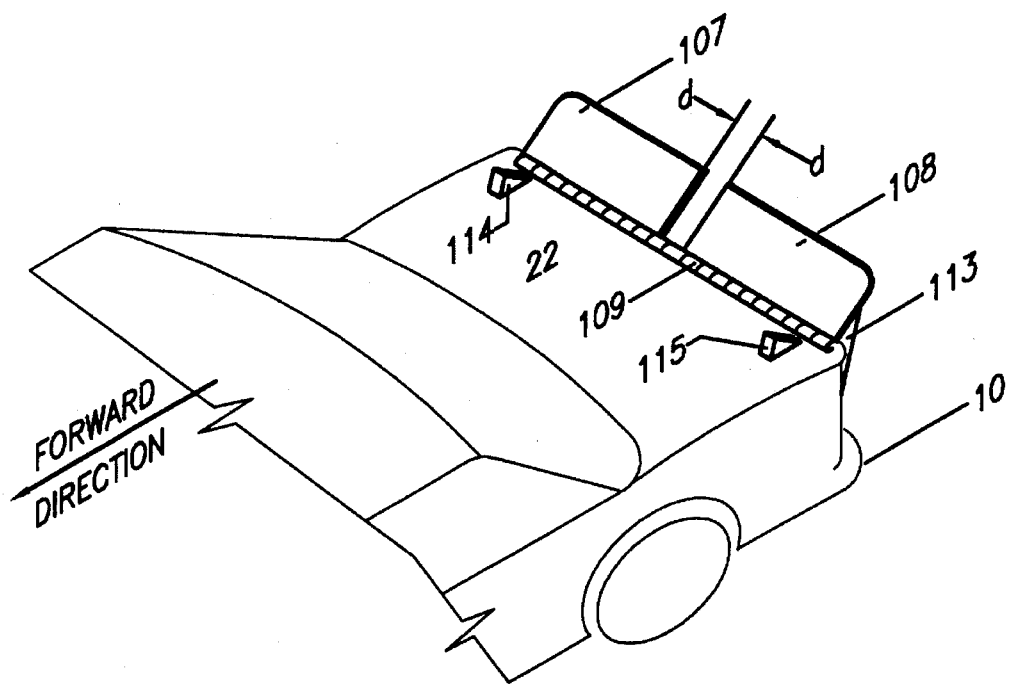
FIG. 11 is a part schematic, top perspective, view of a divided, or segmented, spoiler plate illustrating the rear pivoted position of the segmented spoiler plates when the vehicle is traveling in a high speed forward direction.
Figure 12:
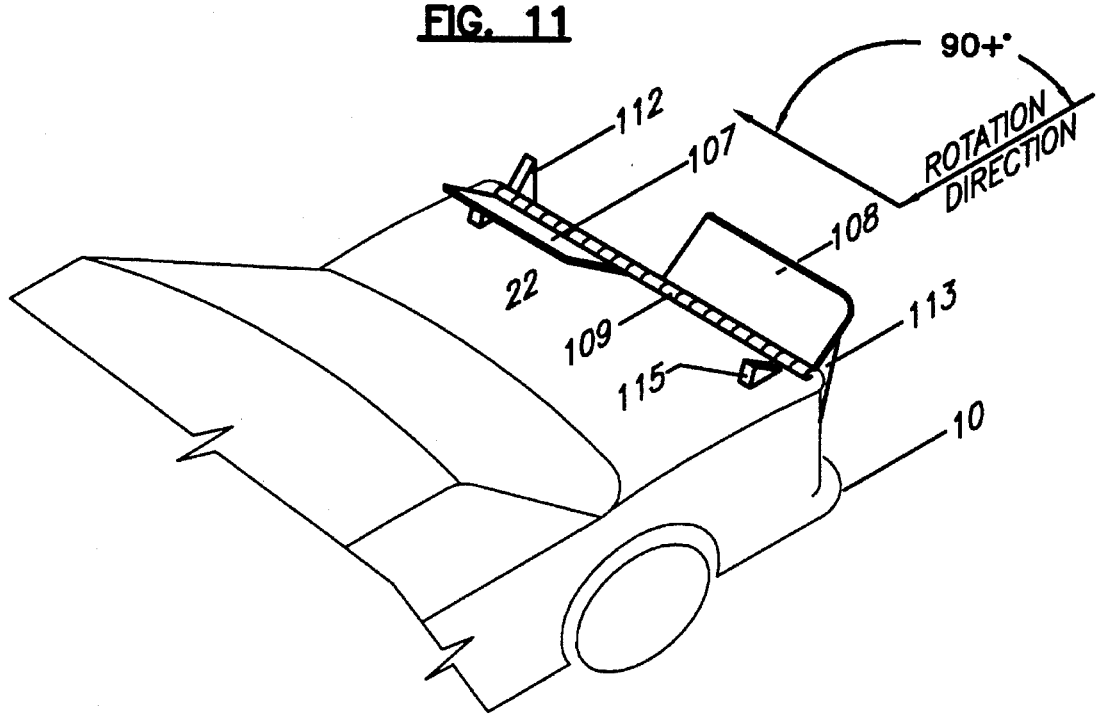
FIG. 12 is a view similar to FIG. 11 and illustrating the forward pivoted position of one of the segmented spoiler plates as the vehicle is involved in a high speed spin from a forward direction to a rearward direction.

Referring now more particularly to FIGS. 11 and 12, a segmented or divided spoiler plate system and the operation thereof will now be described. As shown therein, a divided spoiler plate consisting of two separate, and equally sized, segments are employed and designated by reference numerals 107,108. Segments 107 and 108 are centrally spaced apart a distance equal to that designated by arrows d—d and pivotally movable about a common hinge 109. This spacing distance may be in the range of three-eights inch to three-fourths inch, or more, as so desired, and permits passage of a contour cheek template, employed by NASCAR officials at race tracks to ensure that all participants are complying with predetermined vehicle size and shape standards or regulations. After measuring the contour of vehicle 10 with the cheek template, spacing d—d is closed with a suitable strip of sealing tape (not shown in these FIGS.), as described hereinbefore in reference to FIG. 2. An air dam is also created by employing a strip of the sealing tape over hinge 109, also not shown in these FIGS but as described hereinbefore in reference to FIG. 2.

Rear pylons 112 and 113 are provided with sloping surfaces that contact and limit the rear pivotal movement of spoiler segments 107, 108 as vehicle 10 travels at a high rate of speed in a forward direction. In the event of a spin, which normally occurs in a counter-clockwise direction, due to the vehicle directional movement along race tracks, as vehicle 10 reaches the essentially ninety-degree point in the rotative spin (as indicated by the directional arrows in FIG. 12), spoiler segment 107 begins its forward pivotal movement due to the change in direction of the aerodynamic air flowing over vehicle 10. This pivotal movement of spoiler segment 107 overcomes the frictional contact of the sealing tape covering spacing d—d (and not shown) to permit relative free forward rotative movement of the spoiler segment 107 into contact with forward pylon 114 and permit it to spoil the flow of aerodynamic air now moving over the rear, and toward the front, of vehicle 10. When vehicle 10 has rotated a full one-hundred eighty degrees, spoiler segment 108 also pivots to the forward position against forward pylon 115 and assists spoiler segment 107 in spoiling the aerodynamic air flow over vehicle 10 to priovide a downward force and minimize the possibility of vehicle 10 becoming airborne.

Figure 13:
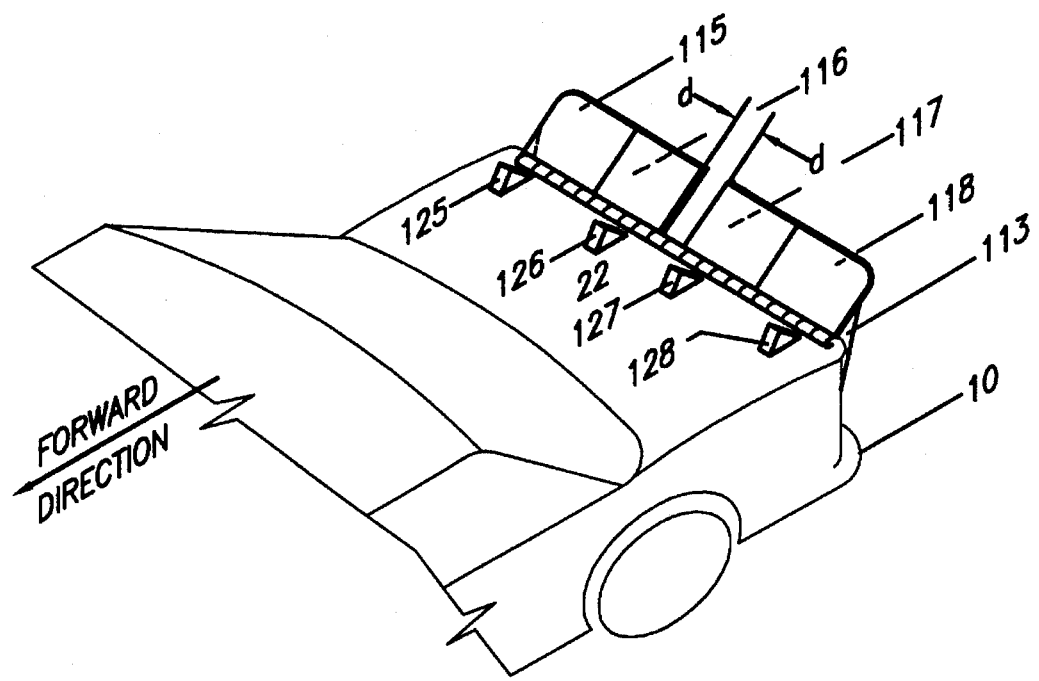
FIG. 13 is a part schematic, top perspective, view of a multiple segmented spoiler plate as it would appear when the vehicle is traveling in a high speed forward direction.
Figure 14:
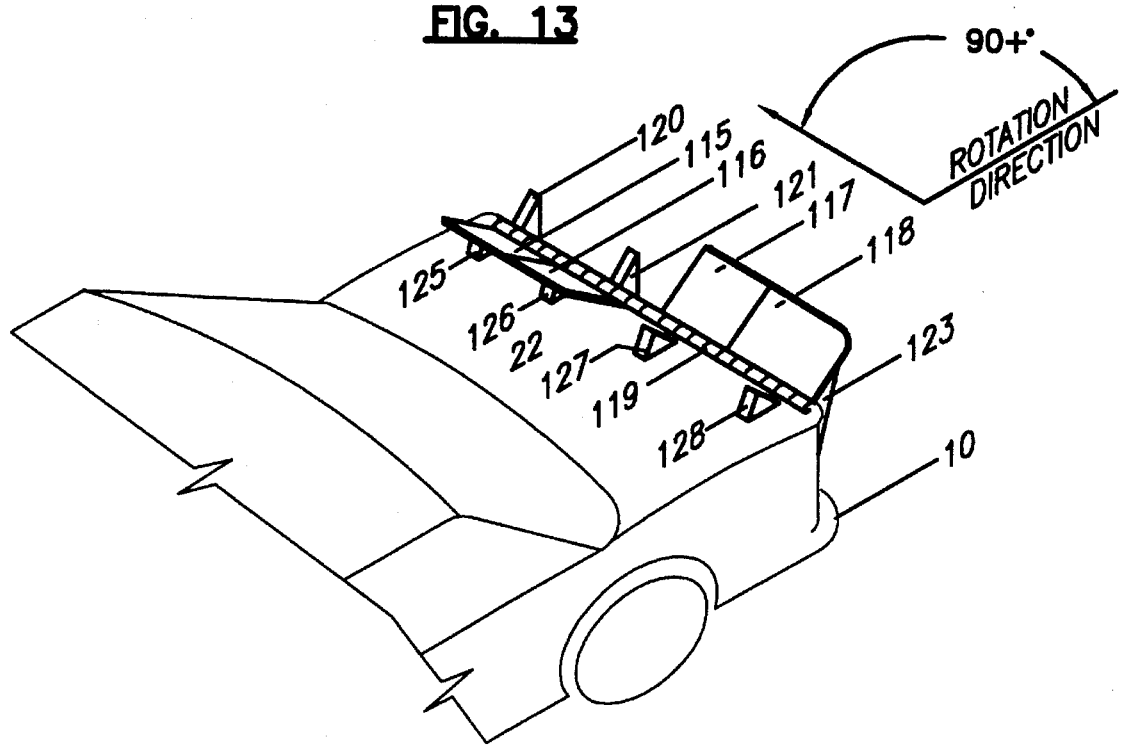
FIG. 14 is a view similar to FIG. 13 illustrating the sequence of moving the spoiler plate segments to the forward pivoted position as influenced by aerodynamic air flow as the vehicle goes into a high speed spin, and to start travel in a rearward direction.

Referring now more particularly to FIGS. 13 and 14, a multiple segmented spoiler plate system and the operation thereof is illustrated. As shown therein multiple spoiler segments disposed in a linear, spaced relationship are employed on the aft end of deck lid 22 of vehicle 10. In this specific embodiment, four spoiler segments are employed and designated by reference numerals 115, 116, 117 and 118. Some spacing is provided between each of the adjacent spoiler plate segments with the widest spacing being designated by arrows d—d between inside spoiler plate segments 116, 117, As described hereinbefore in reference to FIGS. 11,12 spacing d—d is necessary to permit the passage of a contour check template employed by NASCAR officials at race tracks.

After use of the contour check template to ensure that the vehicle shape meets the established criteria for that track, the spacing d—d and the spacing between the other segments may be sealed by strips of sealing tape, as described hereinbefore. Also, a strip of sealing tape (not shown) is employed to cover common hinge 119 connecting each of spoiler segments 115, 116, 117, and 118 to the aft end of deck 22 of vehicle 10, as described hereinbefore in reference to FIG. 2. The strips of sealing tape are omitted in FIGS. 13 and 14 in the interest of clarity.

Each of spoiler segments 115, 116, 117 and 118 is provided with a rear pylon stop member, as designated by respective reference numerals 120, 121, (one not visible in these FIGS) and 123. Each of these pylons are provided with an angular slope surface that engages, and limits rearward pivotal movement of, the respective spoiler segments when in the position shown in FIG. 13, Each of spoiler segments 115, 116, 117 and 118 is also provided with a forward pylon disposed in spaced relationship along the surface of deck lid 22, and designated by reference numerals 125, 126, 127 and 128. Each of these front pylons is also provided with a sloping surface that engages the respective spoiler segments when these segments are pivoted along hinge 119 to the forward position attained by segments 115 and 116 in FIG. 14.

In operation, each of the segments 115, 116, 117 and 118 will be sloping rearwardly and maintained in contact with their respective rear pylons, as shown in FIG. 13, during high speed forward travel of vehicle 10. In the event of a spin, vehicle 10 begins rotation in a counter-clockwise direction, as illustrated by the directional arrows in FIG. 14. During this spin, the air flow over vehicle 10 will shift and cause the segmented spoiler to begin pivoting forward. As illustrated in FIG. 14, spoiler segments 115, 116 have pivoted forward against pylons 125, 126 at approximately the ninety degree point of rotation of vehicle 10. As vehicle 10 continues its rotation, the remaining spoiler segments will pivot forward against their respective pylon stops until, at the one-hundred eighty degree point in the spin, vehicle 10 will be traveling rearward and all spoiled segments will be in the forward position and spoil the air flowing over vehicle 10 to negate the tendency of the vehicle to become airborne.

The specific examples of the present invention described herein are for illustrative purposes only and are not to be deemed exhaustive. There are obviously many variations and modifications of the present invention that will be apparent to those skilled in the art in the light of the above teachings.

The various examples of adjusting mechanisms for the angular relationship of the spoiler system, relative to the horizontal, may be employed in any of the different spoiler plates exemplified in the specific examples. Also, angular adjustment devices, other than those specifically disclosed herein, may be employed for angular adjustment of each of the spoiler plate embodiments disclosed herein, without departing from the spirit and scope of the invention.

Further, although all of the specific examples of the spoiler systems disclosed herein are located on the aft end of the vehicle deck lid, the invention is not so limited. It is considered within the scope of the present invention to provide an aerodynamic responsive spoiler system on any aerodynamic surface of race car vehicles to spoil the airflow thereon and minimize the chance of the vehicle becoming airborne when in a spinning mode, or traveling at a high rate of speed in the rearward direction.

The number of pylons or winglet supports for the specific embodiments disclosed herein have been limited to one forward and one rear pylon for each spoiler plate segment. The invention is not so limited and one, two, or more pylons at both, the rear and forward limiting position for each of the spoiler plate segments, is considered within the scope of the invention. Also, the segmented spoiler plates are not limited to two or four segments, as shown in the specific examples but any number of segments and associated support pylons or winglets may be employed within the scope of the invention.

Although no specific materials or dimensions have been mentioned for constructing the present invention, it is desirable to keep the weight thereof at a minimum and any suitable length, width, thin, and light weight material such as structural composites, metals, aluminum and aluminum alloys, titanium and titanium alloys, and the like, may be employed to construct the component parts described herein. Obviously, when constructing the spoiler plate segments from a non-metallic or non-magnetic material, a strip of magnetic attractive metal must be employed on the segment or plate to fully utilize the magnetic latch described in reference to one of the embodiments disclosed herein.

The foregoing and additional variations and modifications of the specific embodiments described herein will be readily apparent to those skilled in the art in the light of the above teachings.

It is therefore to be understood that, within the scope of the appended claims, the invention may practiced other than as specifically described herein.

What is claimed as new and desired to be secured by Letters Patent of the United States is:

1. A spoiler system for a motor vehicle comprising:

a motor vehicle having aerodynamic surfaces and capable of traveling at high speeds;

an air spoiler system for said motor vehicle;

said air spoiler system including at least one spoiler plate for said motor vehicle;

means for pivotally connecting said at least one spoiler plate to said motor vehicle in a position to spoil the air flow over the aerodynamic surfaces of said motor vehicle during high speed motion;

means for limiting the pivotal movement of said spoiler plate in both a forward and an aft direction relative to the aerodynamic surfaces of said motor vehicle;

said means for limiting the forward and aft pivotal movement of said spoiler plate including at least one first pylon disposed on said motor vehicle aft of said spoiler plate and at least one second pylon disposed on said motor vehicle forward of said spoiler plate.

2. The spoiler system of claim 1 wherein said at least one first pylon disposed on said motor vehicle comprises a first pair of pylons disposed aft of said spoiler plate and spaced transversely on said motor vehicle;

each member of said first pair of pylons disposed aft of said spoiler plate being provided with an angular, rearward sloping, surface serving to engage and limit rearward pivotal movement of said spoiler plate.

3. The spoiler system of claim 2 wherein said at least one second pylon disposed on said motor vehicle comprises a second pair of pylons disposed forward of said spoiler plate and spaced transversely on said motor vehicle;

each member of said second pair of pylons disposed forward of said spoiler plate being provided with an angular, forward sloping, surface and serving to engage and limit forward pivotal movement of said spoiler plate.

4. The spoiler system of claim 1 wherein said at least one first and said at least one second pylon serve to limit pivotal movement of said spoiler plate in the rearward and in the forward direction, respectively, and including means for adjusting and controlling the angular pivotal movement of said spoiler plate in the rearward direction.

5. The spoiler system of claim 4 wherein said at least one first pylon disposed on said motor vehicle comprises a first pair of pylons disposed aft of said spoiler plate and pivotally connected to fixed structure on said motor vehicle; each member of said first pair of pylons being rotatably disposed about a pivot pin extending therethrough; said means for adjusting and controlling the angular pivotal movement of said spoiler plate in the rearward direction including a pair of manually adjustment screws threadingly extending through a depending portion of each member of said first pair of pylons; said pair of manually adjustment screws being in a rotatable connection relationship with said fixed structure on said vehicle; whereby, rotation of said manually adjustment screws in said first pair of pylons in a first direction exerts a pivotal force on, and causes a member of, said first pair of pylons to pivot about its pivot pin to cause a decreasing change in the relative angle thereof with respect to said motor vehicle, and rotation of said manually adjustment screws in each member of said first pair of pylons in a second and opposite direction effects a rotation of said first pylon in the opposite direction to effect an increase in the relative angle of said pylon with respect to the horizontal plane of said motor vehicle.

6. The spoiler system of claim 5 including an electric servo motor driven adjustment screw rotatably connected to said first pylon; whereby, actuation of said electric servo motor driven screw in a first direction causes pivotal movement of said first pylon and results in a decrease in the relative angular relationship of each said pylon and said motor vehicle and rotation of said electric servo motor driven screw in an opposite direction causes an increase of the angular relationship between each said pylon and said motor vehicle.

7. The spoiler system of claim 4 wherein said means for limiting the rearward pivotal movement of said spoiler plate includes a movable insert disposed within said at least one first pylon; said movable insert being disposed on an end of said at least one first pylon and provided with a magnetic latch attachment thereon; said spoiler plate including a metal surface that is magnetically attracted to and releasably adhered to said magnetic latch when coming in contact therewith; means for adjusting the position of said movable insert from a retracted position wherein said magnetic latch is flush with a surface of said at least one pylon that controls the angular movement of said spoiler plate in the rearward direction to an extended position wherein said magnetic latch is raised from the surface of said at least one pylon to thereby contact said spoiler and stop pivotal movement thereof in the rearward direction at an angle relative to the horizontal greater than that when said spoiler plate pivots into contact with said movable insert in the retracted position.

8. The spoiler system of claim 7 wherein said means for adjusting the position of said movable insert includes a pair of manually adjustment screws, said manually adjustment screws being threadingly received through a portion of said at least one pylon and rotatably secured to said movable insert.

9. A spoiler system for a motor vehicle comprising;
a motor vehicle having aerodynamic surfaces and capable of traveling at high speeds; an air spoiler system for said motor vehicle;
said air spoiler system including at least one spoiler plate for said motor vehicle;
means for pivotally connecting said at least one spoiler plate to the trunk area of said motor vehicle and in a position to spoil the air flow over the trunk area and other aerodynamic surfaces of said motor vehicle during high speed motion;
means for limiting the pivotal movement of said spoiler plate in both a forward and an aft direction relative to the aerodynamic surfaces of said motor vehicle;
said means for limiting the pivotal movement of said spoiler plate including a pair of vertically extending winglet pylons disposed in transverse spaced relationship on a horizontal plane of the aerodynamic surface of said motor vehicle;
each of said vertical extending winglet pylons having an arcuate opening therein;
a guide pin integral with and extending from each end of said spoiler plate;
each said guide pin being disposed through one of the arcuate openings in each said winglet pylon;
said arcuate openings in said winglet pylons serving to restrict pivotal movement of said spoiler plate by stopping movement of said integral guide pins in both the rearward and forward direction.

10. The spoiler system of claim 9 wherein said arcuate opening in said winglet pylons limit rearward and forward pivotal movement of said spoiler plate to a relative distance of essentially thirty-five to fifty-five degrees from the horizontal plane of the-aerodynamic surface of said motor vehicle.

11. A spoiler system for a motor vehicle comprising, in combination:
a motor vehicle;
an air spoiler transversely disposed on an aerodynamic surface of said motor vehicle;
hinge means pivotally connecting said air spoiler to said motor vehicle;
at least one first pair of spaced pylons disposed on said motor vehicle;
each member of said at least one first pair of pylons having an angular, rearward sloping, surface relative to said motor vehicle;
said air spoiler contacting said at least one first pair of pylons and serving to exert a downward force on said motor vehicle when said motor vehicle is traveling in a forward direction;
at least one second pair of spaced pylons disposed on said motor vehicle and spaced forward on said motor vehicle relative to said first pair of pylons;
each member of said at least one second pair of pylons having an angular, forward sloping, surface relative to said motor vehicle; whereby
air flow passing over said motor vehicle during high speed, forward, vehicle motion causes said air spoiler to pivot into contacting relationship with said angular, rearward sloping, surfaces of said at least one first pair of spaced pylons thereby causing said spoiler to exert a downward force on said motor vehicle; and, when said motor vehicle is traveling in a high speed, rearward direction, said spoiler will pivot away from said at least one first pair of spaced pylons to contact said angular, forward sloping, surfaces of said at least one second pair of spaced pylons to thereby spoil the aerodynamic air flow lift over the vehicle roof surface, and continue to exert a downward force on said motor vehicle and deter said motor vehicle from becoming airborne; and, upon resumption of its normal forward motion, said air spoiler will again pivot rearwardly to resume contacting relationship with said angular, rearward sloping surfaces, of said at least one first pair of spaced pylons.

12. The spoiler system of claim 11 wherein said air spoiler comprises multiple spoiler plates disposed in spaced transverse relationship on the aerodynamic surface of said motor vehicle; said hinge means serving as a hinge for each of said multiple spoiler plates; said hinge means permitting independent pivotal movement of each member of said multiple spoiler plates; and wherein said at least one first pair of spaced pylons and said at least one second pair of spaced pylons includes a first and a second pylon for each member of said multiple spoiler plates.

13. The spoiler system of claim 11 wherein said air spoiler transversely disposed on an aerodynamic surface of said motor vehicle includes a pair of air spoiler segments disposed in laterally, spaced, relationship to leave a spaced area therebetween, and sealing tape means releasably secured to each member of said pair of air spoiler segments to close the spaced area therebetween when said air spoiler segments are pivoted against said at least first pair of pylons during high speed forward vehicle motion and said sealing tape means releasing said pair of air spoiler segments for sequential movement from contact with said at least first pair of pylons to contact with said at least one second pair of pylons when said vehicle motion is changed to a high speed rearward direction.

14. A method of preventing a race car vehicle from becoming airborne and undergoing a tumbling movement when subjected to a spin during a high speed race comprising:

providing a pivotally connected spoiler plate secured to a surface of the vehicle and in position to pivot forwardly at a predetermined angle to thereby spoil the aerodynamic air flow over the rear window and roof and exert down forces on the rear of the vehicle when the vehicle undergoes a spin and commences rearward high speed motion; and providing stop mechanism on the vehicle to limit forward pivotal movement of the spoiler plate when the vehicle undergoes a spin to change the forward high speed motion thereof to a rearward high speed motion.

15. The method of claim 14 including the steps of:

providing the spoiler plate in position to pivot rearwardly at a predetermined angle to thereby also spoil the aerodynamic air flow over the vehicle during high speed forward motion of the vehicle; and providing adjustable stops on the vehicle to contact and control the rearward pivotal movement of the spoiler plate.

16. The method of claim 15 wherein the step of providing a pivotally connected spoiler plate secured to a surface of the vehicle includes the step of providing a plurality of linearly spaced segments forming the pivotally connected spoiler plate; the step of providing stop mechanism on the vehicle to limit forward pivotal movement of the spoiler plate includes providing a separate forward stop for each of the linearly spaced spoiler plate segments; and the step of providing adjustable stops on the vehicle to contact and control the rearward pivotal movement of the spoiler plate includes providing a separate adjustable stop for each of the linearly spaced spoiler plate segments.

17. The method of claim 15 including:

providing a pivotal connection for the adjustable stops on the vehicle;

providing a pair of adjustment screws for adjusting the angular position of the adjustable stops;

employing one member of the adjustment screw pair as a standard for setting the minimum angle authorized for the pivotal spoiler before a race;

providing a sealing structure to seal and lock the one member of the adjustment screw pair in the set position; and, employing the other member of the adjustable screw pair to permit the race car pit crew to increase the angular limits of the rearward pivotal movement of the spoiler plate system during a race while preventing the decrease of the angular limits without breaking the seal and lock on the one member of the adjustment screw pair.

18. The method of claim 17 including providing a servo motor actuated adjustment screw for also permitting the driver of the race car to increase the angular limits of the rearward pivotal movement of the spoiler plate system during a race while preventing the decrease of the angular limits without breaking the seal and lock on the one member of the adjustment screw pair.

* * * * *